United States Patent
Kim et al.

(10) Patent No.: US 10,962,736 B2
(45) Date of Patent: Mar. 30, 2021

(54) CAMERA MODULE

(71) Applicant: Samsung Electro-Mechanics Co., Ltd., Suwon-si (KR)

(72) Inventors: Jae Kyung Kim, Suwon-si (KR); Dae Hyun Jeong, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 138 days.

(21) Appl. No.: 16/018,574

(22) Filed: Jun. 26, 2018

(65) Prior Publication Data

US 2019/0011661 A1    Jan. 10, 2019

(30) Foreign Application Priority Data

Jul. 6, 2017   (KR) .................. 10-2017-0086086
Mar. 20, 2018  (KR) .................. 10-2018-0032030

(51) Int. Cl.
| | |
|---|---|
| *G02B 7/04* | (2021.01) |
| *G02B 13/00* | (2006.01) |
| *H02K 41/035* | (2006.01) |
| *G03B 13/34* | (2021.01) |
| *H02K 11/215* | (2016.01) |
| *G03B 3/10* | (2021.01) |

(52) U.S. Cl.
CPC ............. *G02B 7/04* (2013.01); *G02B 13/001* (2013.01); *G03B 3/10* (2013.01); *G03B 13/34* (2013.01); *H02K 11/215* (2016.01); *H02K 41/0354* (2013.01); *G03B 2205/0069* (2013.01); *H02K 2203/03* (2013.01)

(58) Field of Classification Search
CPC .......... G02B 7/04; G02B 13/001; G02B 7/08; G03B 13/34; H02K 41/0354
See application file for complete search history.

(56) References Cited

U.S. PATENT DOCUMENTS

| | | |
|---|---|---|
| 2010/0123788 A1 | 5/2010 | Shin |
| 2010/0128371 A1 | 5/2010 | Yoon et al. |
| 2013/0141639 A1 | 6/2013 | Kim et al. |
| 2013/0321937 A1 | 12/2013 | Baik et al. |

(Continued)

FOREIGN PATENT DOCUMENTS

| | | |
|---|---|---|
| CN | 103454745 A | 12/2013 |
| CN | 203968178 U | 11/2014 |

(Continued)

OTHER PUBLICATIONS

Korean Office Action dated Apr. 24, 2019 in counterpart Korean Patent Application No. 10-2018-0032030 (11 pages in English and 7 pages in Korean).

(Continued)

*Primary Examiner* — Jack Dinh
(74) *Attorney, Agent, or Firm* — NSIP Law

(57) ABSTRACT

A camera module includes: a housing configured to accommodate a lens module; and an actuator configured to move the lens module in an optical axis direction, and including a magnet disposed in the lens module and a coil facing the magnet, wherein a convex portion and a first step difference portion stepped from the convex portion are disposed on one surface of the lens module, wherein the first step difference portion is offset to one side of the lens module, with respect to the one surface of the lens module, and wherein the magnet is disposed in the first step difference portion.

16 Claims, 10 Drawing Sheets

(56) References Cited

U.S. PATENT DOCUMENTS

| | | |
|---|---|---|
| 2014/0362285 A1 | 12/2014 | Min et al. |
| 2015/0381781 A1 | 12/2015 | Feng |
| 2017/0160557 A1 | 6/2017 | Bang et al. |
| 2019/0011661 A1 | 1/2019 | Kim et al. |

FOREIGN PATENT DOCUMENTS

| | | |
|---|---|---|
| CN | 104238064 A | 12/2014 |
| CN | 208905060 U | 5/2019 |
| JP | 2008-164870 A | 7/2008 |
| KR | 10-0920609 B1 | 10/2009 |
| KR | 10-2009-0122105 A | 11/2009 |
| KR | 10-2010-0056202 A | 5/2010 |
| KR | 10-2013-0061539 A | 6/2013 |
| KR | 10-2017-0067044 A | 6/2017 |
| WO | WO 2009/142371 A1 | 11/2009 |

OTHER PUBLICATIONS

Chinese Office Action dated Mar. 4, 2020 in corresponding Chinese Patent Application No. 201810735167.0 (7 pages in English, 6 pages in Chinese).

I-I'

CAMERA MODULE

CROSS-REFERENCE TO RELATED APPLICATIONS

This application claims the benefit under 35 U.S.C. § 119(a) of Korean Patent Application Nos. 10-2017-0086086 and 10-2018-0032030 filed on Jul. 6, 2017 and Mar. 20, 2018, respectively, in the Korean Intellectual Property Office, the entire disclosures of which are incorporated herein by reference for all purposes.

BACKGROUND

1. Field

The following description relates to a camera module.

2. Description of Related Art

Recently, portable electronic devices such as tablet personal computers (PCs), notebook computers, and smartphones, have employed a camera module.

A camera module is commonly disposed in a bezel region of a portable electronic device. For example, the bezel region is a region including a bezel formed on a front surface of the portable electronic device. The bezel is an edge obtained by spacing edges of a display module of the portable electronic device apart from edges of the front surface of the portable electronic device.

Recently, there has been a demand for bezel-less technology of significantly thinning an edge portion of the front surface of a portable electronic device such that an edge portion of a display module generally coincides with the edge portion of the front surface.

However, a camera module is commonly disposed in the bezel region of a portable electronic device. Thus, the extent to which the bezel can be made thinner is limited due to the size of the camera module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a housing configured to accommodate a lens module; and an actuator configured to move the lens module in an optical axis direction, and including a magnet disposed in the lens module and a coil facing the magnet, wherein a convex portion and a first step difference portion stepped from the convex portion are disposed on one surface of the lens module, wherein the first step difference portion is offset to one side of the lens module, with respect to the one surface of the lens module, and wherein the magnet is disposed in the first step difference portion.

A shortest distance between a reference line and the magnet may be less than a shortest distance between the reference line and the convex portion, wherein the reference line is an imaginary straight line extending through an optical axis of the camera module in a length direction of the lens module.

A shortest distance between the reference line and the coil may be less than the shortest distance between the reference line and the convex portion.

A second step difference portion stepped from the convex portion may be offset to another side of the lens module, with respect to the one surface of the lens module, and a magnetic member may be installed in the second step difference portion.

A shortest distance between a reference line and the magnetic member may be less than a shortest distance between the reference line and the convex portion, wherein the reference line is an imaginary straight line extending through an optical axis of the camera module in a length direction of the lens module.

The camera module may further include: a first yoke facing the magnet and fixed to the housing; and a second yoke facing the magnetic member and fixed to the housing.

The camera module may further include: a sensing coil portion disposed to face the magnetic member and having an inductance that varies as the magnetic member is moved in the optical axis direction.

The sensing coil portion may include a first sensing coil and a second sensing coil that are arranged in a column in the optical axis direction.

A direction along an optical axis of the camera module in which movement of the lens barrel increases an inductance of the first sensing coil may be different from a direction along the optical axis in which movement of the lens barrel increases an inductance of the second sensing coil. A direction along the optical axis in which movement of the lens barrel decreases the inductance of the first sensing coil may be different from a direction along the optical axis in which movement of the lens barrel decreases the inductance of the second sensing coil.

The lens module may include a lens barrel including lenses, and a carrier coupled to the lens barrel and configured to move in the optical axis direction along with the lens barrel, wherein the lens barrel includes a plane portion at a lateral surface of the lens barrel, wherein a shortest distance between a reference line and the magnet is less than a shortest distance between the reference line and the plane portion, and wherein the reference line is an imaginary straight line extending through an optical axis of the camera module in a length direction of the lens module.

A shortest distance between the reference line and the coil may be less than a shortest distance between the reference line and the plane portion.

A distance between an optical axis of the camera module and one external side surface of the housing may be less than a distance between the optical axis and another external side surface of the housing opposite the one external side surface of the housing.

In another general aspect, a camera module includes: a housing configured to accommodate a lens module; a first actuator including a first magnet offset to one side of the lens module, with respect to one surface of the lens module, and a first coil facing the first magnet; and a second actuator including a second magnet offset to another side of the lens module, with respect to the one surface of the lens module, and a second coil facing the second magnet, wherein a convex portion, and first and second step difference portions stepped on opposite sides of the convex portion are disposed on the one surface of the lens module; and wherein the first magnet is disposed in the first step difference portion and the second magnet is disposed in the second step difference portion.

A shortest distance between an optical axis of the camera module and a straight line extending on one surface of the first magnet, and a shortest distance between the optical axis and a straight line extending on one surface of the second magnet, may be less than a shortest distance between the optical axis and the convex portion.

A shortest distance between an optical axis of the camera module and a straight line extending on one surface of the first coil, and a shortest distance between the optical axis and a straight line extending on one surface of the second coil, may be less than a shortest distance between the optical axis and the convex portion.

The lens module may include a lens barrel including lenses, and a carrier coupled to the lens barrel and configured to move in the optical axis direction along with the lens barrel, wherein the lens barrel includes a plane portion at a lateral surface of the lens barrel, and wherein a shortest distance between an optical axis of the camera module and a straight line extending on one surface of the first magnet, and a shortest distance between the optical axis and a straight line extending on one surface of the second magnet, are less than a shortest distance between the optical axis and the plane portion.

In another general aspect, a camera module includes: a housing; a lens module including a carrier disposed in the housing, wherein the carrier includes a lateral surface having a central portion and stepped-in portion disposed adjacent to the central portion, and a lens barrel coupled to the carrier and configured to move in an optical axis direction of the camera module along with the carrier; and an actuator configured to move the carrier in the optical axis direction, wherein the actuator includes a magnet disposed in the stepped-in portion, and a coil facing the magnet.

A shortest distance between a reference line and the magnet may be less than a shortest distance between the reference line and the central portion, wherein the reference line is an imaginary straight line extending through an optical axis of the camera module in a length direction of the lens module.

A shortest distance between the reference line and the coil may be less than the shortest distance between the reference line and the central portion.

A shortest distance between the reference line and the coil may be less than the shortest distance between the reference line and the central portion.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
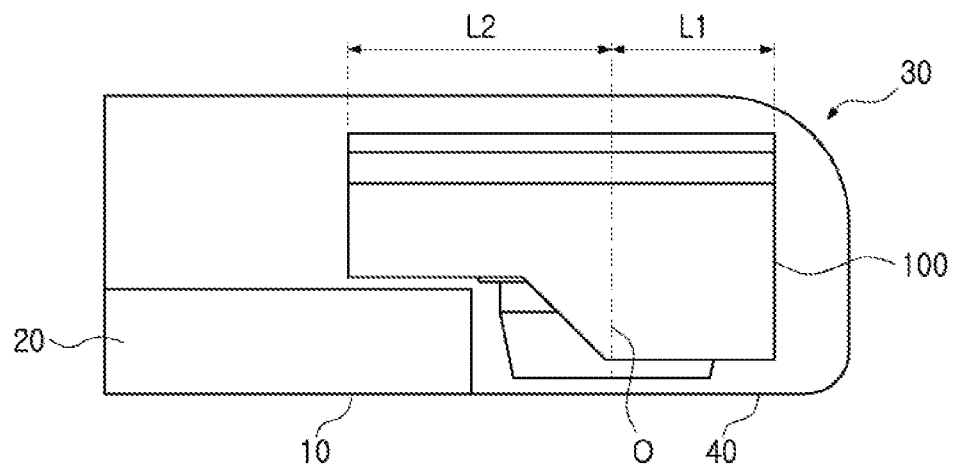
FIG. 1 is a schematic diagram illustrating a camera module installed on a portable electronic device, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

The following disclosure relates to a camera module that, for example, may be installed on a portable electronic device such as a mobile communications terminal, a smartphone, or a tablet personal computer (PC).

Figure 2:
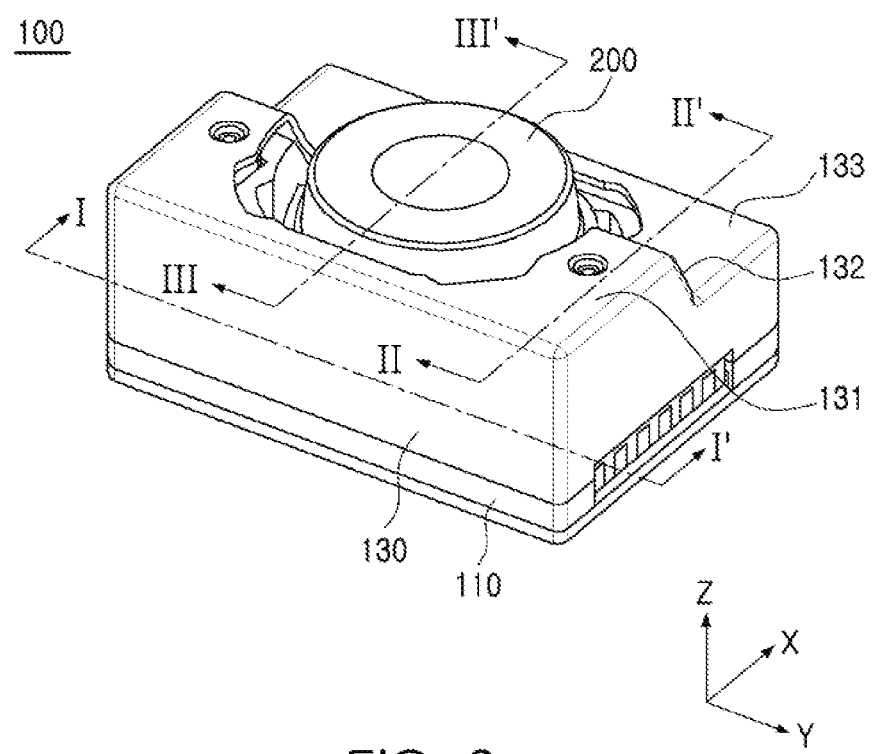
FIG. 2 is a perspective view of the camera module of FIG. 1.
Figure 3:
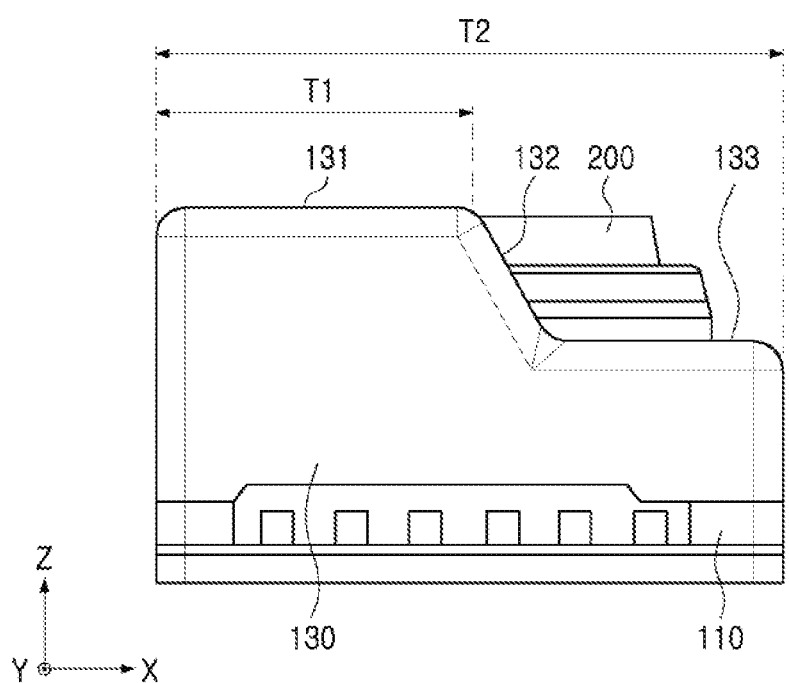
FIG. 3 is a side view of the camera module of FIG. 1.

FIG. 1 is a schematic diagram illustrating a camera module 100 installed on a portable electronic device 30, according to an embodiment. FIG. 2 is a perspective view of the camera module 100, and FIG. 3 is a side view of the camera module 100.

Referring to FIG. 1, a touch panel 10 may be arranged on a front surface of a portable electronic device 30 and a display module 20 may be arranged below the touch panel 10 (i.e., inside the portable electronic device 30).

The display module 20 may be a liquid crystal display (LCD) module and the LCD module may be formed in such a way that a glass, an LCD, a substrate, and a backlight unit are sequentially arranged toward a rear surface from the front surface of the portable electronic device 30.

Although the display module 20 is described as an LCD module, the display module 20 may be an organic light emitting diode (OLED) module and may also be other display devices.

A bezel 40 may be disposed on the front surface of the portable electronic device 30. The bezel 40 is, for example, an edge obtained by removing the display module 20 from the front surface of the portable electronic device 30.

Recently, there has been a need for bezel-less technology of significantly thinning an edge around the display module 20.

The camera module 100 is disposed on the bezel 40 of the front surface of the portable electronic device 30 and, thus, an amount by which the bezel 40 may be made thinner is limited the size of the camera module 100.

However, the camera module 100 may reduce a space occupied by an actuator 300, thereby thinning the bezel 40 of the front surface of the portable electronic device 30.

Referring to FIG. 1, a distance L1 between an optical axis O of the camera module 100 and one external side surface of a housing 110 (or a case 130) may be less than a distance L2 between the optical axis O of the camera module 100 and the opposite external side surface of the housing 110 (or the case 130).

Figure 8:
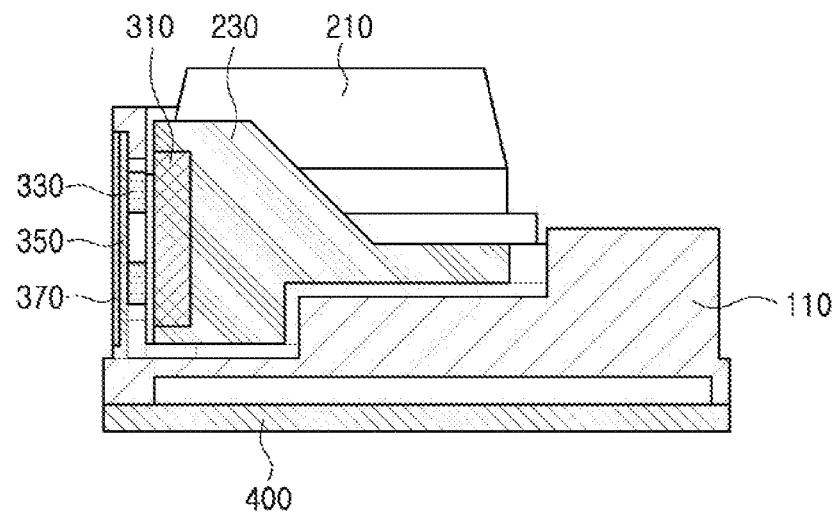
FIG. 8 is a schematic cross-sectional view taken along a line II-II' of FIG. 2.

The one external side surface of the housing 110 may be a surface on which a substrate 350 including a coil 330 of the actuator 300 is disposed, as shown in FIG. 8.

That is, referring back to FIG. 1, the camera module 100 may be configured such that the distance L1 between the optical axis O of the camera module 100 and the one external side surface of the housing 110 is relatively short.

The optical axis O of the camera module 100 may be offset from a center of the housing 110.

According to the embodiment illustrated in FIGS. 1 to 3, the space occupied by the actuator 300 (FIG. 8) may be reduced and, thus, the distance L1 between the optical axis O of the camera module 100 and the one external side surface of the housing 110 may be relatively short, thereby enabling thinning of the bezel 40 of the front surface of the portable electronic device 30.

Even if the space occupied by the actuator 300 is reduced in the camera module 100, when an entire portion of the camera module 100 is arranged in a region of the bezel 40 of the portable electronic device 30, there is a limitation on providing bezel-less technology. Accordingly, referring to FIGS. 1 to 3, the display module 20 and the camera module 100 may at least partially overlap each other in a thickness direction of the portable electronic device 30. To this end, the camera module 100 may be formed in such a way that upper surfaces of the case 130, the housing 110, and a lens module 200 are stepped.

Referring to FIGS. 2 and 3, an upper surface of the case 130 may include a first surface 131, a second surface 132, and a third surface 133.

The first surface 131 may be convex, or stepped-up, as compared with the third surface 133 and the third surface 133 may be concave, or stepped-down, as compared with the first surface 131. The second surface 132 may be a connection surface between the first surface 131 and the third surface 133 and may be inclined.

For example, the upper surface of the case 130 may include a step difference portion that is concave, as compared with the other portion of the case 130. The step difference portion may include the second surface 132 and the third surface 133.

Each of upper surfaces of the housing 110 and the lens module 200, corresponding to the upper surface of the case 130, may also include a step difference portion that is concave, as compared with another portion.

Referring to FIG. 3, a length T1 (length in an X-direction) of a first portion of the upper surface of the case 130 may be less than half an overall length T2 (length in the X-direction) of the upper surface of the case 130.

Referring to FIGS. 1 to 3, the step difference portion of the case 130, the step difference portion of the housing 110, and the step difference portion of the lens module 200 may each at least partially overlap the display module 20 in a thickness direction of the portable electronic device 30.

Accordingly, due to the configuration of the camera module 100, the bezel 40 of the portable electronic device 30 may be significantly thinned.

Figure 4:
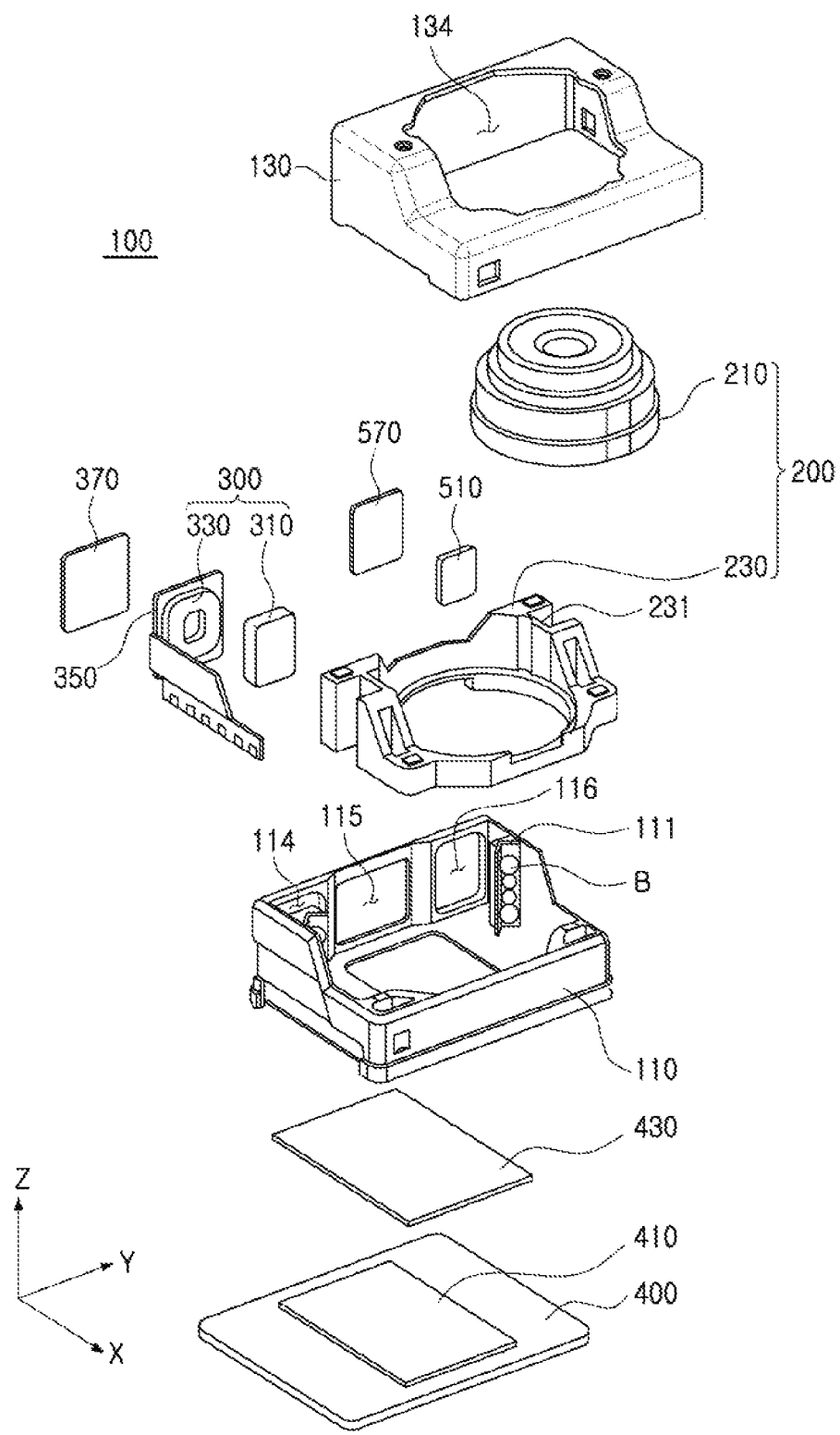
FIGS. 4 and 5 are exploded perspective views of the camera module of FIG. 1.
Figure 5:
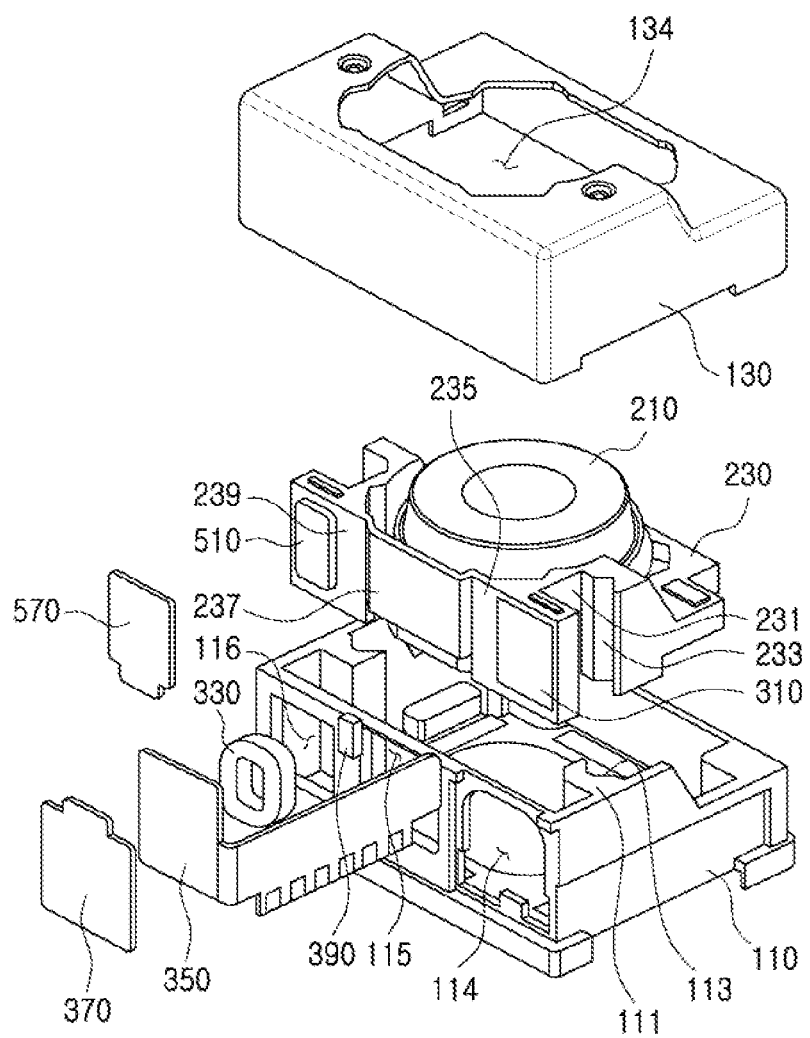

FIGS. 4 and 5 are exploded perspective views of the camera module 100.

Referring to FIGS. 4 and 5, the camera module 100 may include the lens module 200, the housing 110 for accommodating the lens module 200 therein, and the case 130.

The lens module 200 may include a lens barrel 210 and a carrier 230.

The lens barrel 210 may accommodate at least one lens for photographing an object. When multiple lenses are provided, the lenses may be installed inside the lens barrel 210 along an optical axis.

The lens barrel 210 may be coupled to the carrier 230 and the lens barrel 210, and the carrier 230 may be accommodated in the housing 110.

The case 130 may be coupled to the housing 110 to surround an external surface of the housing 110, and a through hole 134 may be formed in the upper surface of the case 130 to allow light to be incident on the lens barrel 210.

The lens barrel 210 and the carrier 230 may be accommodated in the housing 110 and may be configured to be moved in an optical-axis direction (z-axis direction) for focal point adjustment. That is, the lens barrel 210 and the carrier 230 may be moved in the optical-axis direction (z-axis direction) to adjust a focal point and, to this end, the housing 110 may include the actuator 300.

A printed circuit board (PCB) 400 on which an image sensor 410 is installed may be arranged below the housing 110. The image sensor 410 may convert light transmitted through the lens barrel 210 into an electrical signal to generate an image. The image sensor 410 may have a rectangular shape.

For example, the image sensor 410 may be a charge coupled device (CCD) or a complementary metal-oxide semiconductor (CMOS). The electrical signal converted by the image sensor 410 may be output as an image through the display module 20 of the portable electronic device 30. The image sensor 410 may be fixed to the PCB 400 and may be electrically connected via wire bonding.

An infrared filter 430 may be installed below the housing 110. Accordingly, the infrared filter 430 may be arranged between the lens module 200 and the image sensor 410 and may block light in the infrared region of light emitted through the lens module 200.

The camera module 100 may move the lens module 200 to focus on an object. For example, the present disclosure may include the actuator 300 for moving the lens module 200 in the optical axis direction (Z-axis direction).

The actuator 300 may be arranged to be offset to one side of the housing 110 and the lens module 200. For example, as seen in a direction (e.g., x-axis direction) perpendicular to the optical-axis direction (the Z-axis direction), the actuator 300 may be arranged to be offset to one side of the housing 110, based on with respect to one surface (e.g., lateral surface) of the housing 110. In addition, the actuator 300 may be arranged to be offset to one side of the lens module 200, with respect to one surface (e.g., lateral surface) of the lens module 200.

The actuator 300 may generate driving force to move the lens module 200 in the optical axis direction (Z-axis direction). The actuator 300 may include a magnet 310 installed in the lens module 200 and the coil 330 arranged to face the magnet 310.

The magnet 310 may be installed to be offset to one side of the lens module 200. For example, the magnet 310 may be installed on one surface (e.g., lateral surface) of the carrier 230 and may be arranged to be offset to one side of the carrier 230, with respect to one surface of the carrier 230.

The coil 330 may be installed on one surface of the substrate 350 to face the magnet 310. The substrate 350 may be fixed to the housing 110. The substrate 350 may be arranged to be offset to one side of the housing 110, with respect to on one surface (e.g., lateral surface) of the housing 110.

The housing 110 may have an open portion at which the substrate 350 and the coil 330 are installed. For example, an opening 114 may be formed in a lateral surface of the housing 110 and the coil 330 may be arranged in the opening 114.

The magnet 310 may be a movable member installed in the carrier 230 and configured to move in the optical axis direction (z-axis direction) along with the carrier 230. The coil 330 may be a fixed member fixed to the housing 110.

When power is applied to the coil 330, the carrier 230 may be moved in the optical-axis direction (Z-axis direction) by electromagnetic influence between the magnet 310 and the coil 330.

The lens barrel 210 may be coupled to the carrier 230 and, thus, the lens barrel 210 may also be moved in the optical axis direction (z-axis direction) via movement of the carrier 230.

When the carrier 230 is moved, one or more rolling members B may be arranged between the carrier 230 and the housing 110 to reduce friction between the carrier 230 and the housing 110. The rolling member(s) B may have a ball shape.

As seen in a direction perpendicular (e.g., x-axis direction) to an optical axis, the rolling member(s) B may at least partially overlap the magnet 310.

The housing 110 may include a guide protrusion 111 protruding toward the carrier 230. The carrier 230 may include a guide groove 231 into which the guide protrusion 111 is inserted. As shown in FIG. 5, surfaces of the guide protrusion 111 and the guide groove 231 that face each other may include accommodation grooves 113 and 233 for accommodating the rolling member(s) B, respectively.

The rolling member(s) B may be arranged between the guide protrusion 111 and the guide groove 231 and may contact the guide protrusion 111 and the guide groove 231 to roll in an optical axis direction (Z-axis direction).

Referring to FIGS. 4 and 5, a first yoke 370 may be installed on the substrate 350. For example, the first yoke 370 may be disposed on the other surface of the substrate 350 (opposite the one surface of the substrate 350 on which the coil 330 is disposed). Accordingly, the first yoke 370 may be arranged to face the magnet 310 and the coil 330 may be arranged between the first yoke 370 and the magnet 310.

Attractive force may be applied between the first yoke 370 and the magnet 310 in a direction (e.g., an X-axis direction) perpendicular to the optical axis.

The first yoke 370 and the magnet 310 are arranged to be offset to one side of the housing 110 (or one side of the lens module 200) and, thus, attractive force applied between the first yoke 370 and the magnet 310 may also be generated to be offset to one side of the housing 110 and the lens module 200.

The carrier 230 may include a magnetic member 510. For example, the magnetic member 510 may be installed on one surface (e.g., lateral surface) of the carrier 230 and may be arranged to be offset to the other side of the carrier 230 (opposite to the one side of the carrier 230 to which the magnet 310 is offset), with respect to the one surface of the carrier 230.

That is, the magnet 310 may be arranged on one surface of the carrier 230 to be offset to one side of the carrier 230, and the magnetic member 510 may be arranged on the one surface of the carrier 230 to be offset to the other side of the carrier 230.

A second yoke 570 may be installed in the housing 110 to face the magnetic member 510. The housing 110 may have an open portion at which the second yoke 570 is installed. For example, an opening 116 may be formed in a lateral surface of the housing 110 to accommodate the yoke 570 therein.

Attractive force may be applied between the magnetic member 510 and the second yoke 570 in a direction (e.g., X-axis direction) perpendicular to the optical axis. For example, at least one of the magnetic member 510 and the second yoke 570 may be a magnet.

Accordingly, the rolling member(s) B may be maintained in a state of contact with the carrier 230 and the housing 110 by attractive force between the first yoke 370 and the magnet 310, and attractive force between the second yoke 570 and the magnetic member 510.

A closed-loop control method of detecting and feeding back a position of the lens barrel 210 may be used. Accordingly, a position sensor 390, shown in FIGS. 5 and 6, may be provided for close-loop control. The position sensor 390 may be a hall sensor and may be arranged inside the coil 330 (see FIG. 6).

The magnet 310 and the magnetic member 510 may be disposed on one surface (e.g., a lateral surface) of the lens module 200.

Referring to FIG. 5, a convex portion 237, and a first step difference portion 235 and a second step difference portion 239 that are stepped from the convex portion 237 may be disposed on one surface of the lens module 200. For example, the convex portion 237, the first step difference portion 235, and the second step difference portion 239 may be disposed on the one surface (e.g., the lateral surface) of the carrier 230.

The first step difference portion 235 and the second step difference portion 239 may be positioned inward in the X-axis direction, compared with the convex portion 237.

The first step difference portion 235 may be arranged to be offset to one side of the lens module 200, with respect to the one surface of the lens module 200. The second step difference portion 239 may be arranged to be offset to the other side of the lens module 200 (opposite to the one side of the lens module 200), with respect to the one surface of the lens module 200. That is, the first step difference portion 235 and the second step difference portion 239 may be stepped-in on opposite sides of the convex portion 237.

The magnet 310 and the magnetic member 510 may be installed on the one surface (e.g., lateral surface) of the carrier 230. A portion of the carrier 230, on which the magnet 310 and the magnetic member 510 are installed, may be stepped-in from the convex portion 237 of the one surface of the carrier 230.

The magnet 310 may be installed in the first step difference portion 235 and the magnetic member 510 may be installed in the second step difference portion 239.

Figure 7:
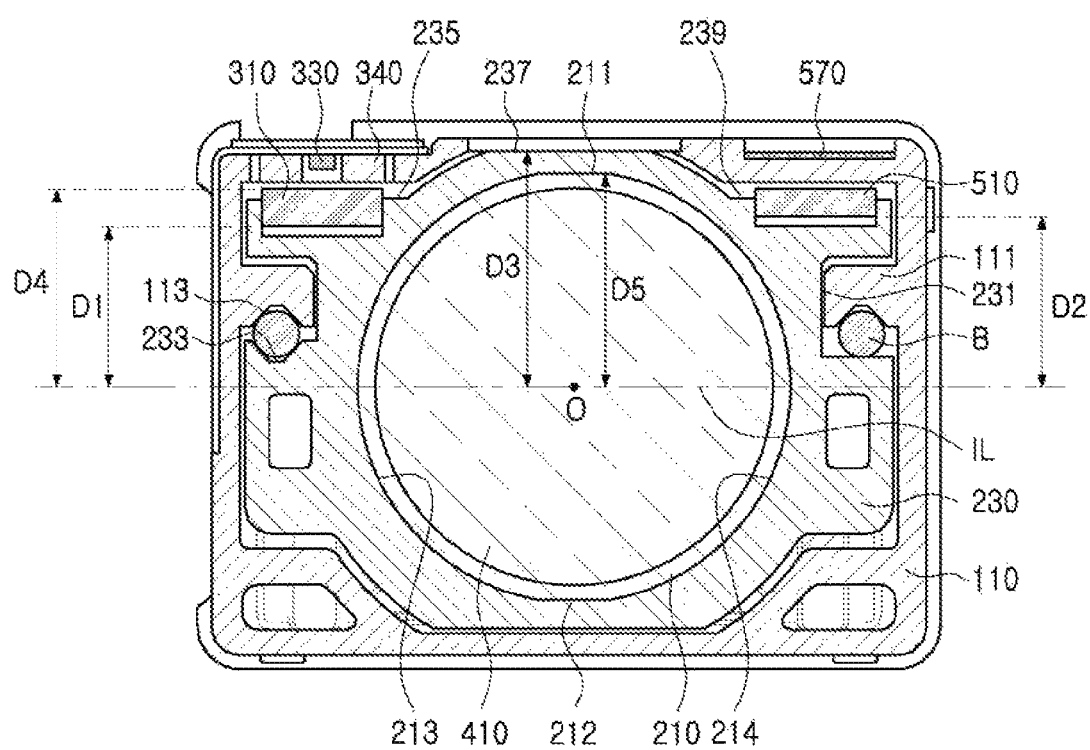
FIG. 7 is a schematic cross-sectional view taken along a line I-I' of FIG. 2.

Accordingly, as shown in FIG. 7, a shortest distance between the magnet 310 and an imaginary straight line IL (hereinafter referred to as a reference line) that extends through the optical axis O in a length direction (e.g., Y-axis direction) of the lens module 200, and a shortest distance between the magnetic member 510 and the imaginary straight line IL, may be less than a shortest distance between the reference line IL and the convex portion 237 (refer to FIG. 7).

Referring to FIG. 5, an opening 115 may be formed in a lateral surface of the housing 110 to prevent interference with the convex portion 237 of the carrier 230. The convex portion 237 of the carrier 230 may be arranged to be disposed in the opening 115 of the housing 110 and exposed out of the housing 110 through the opening 115. For example, the convex portion 237 of the carrier 230 may be arranged between internal and external surface of the opening 115 of the housing 110 (please refer to FIG. 7).

Figure 6:
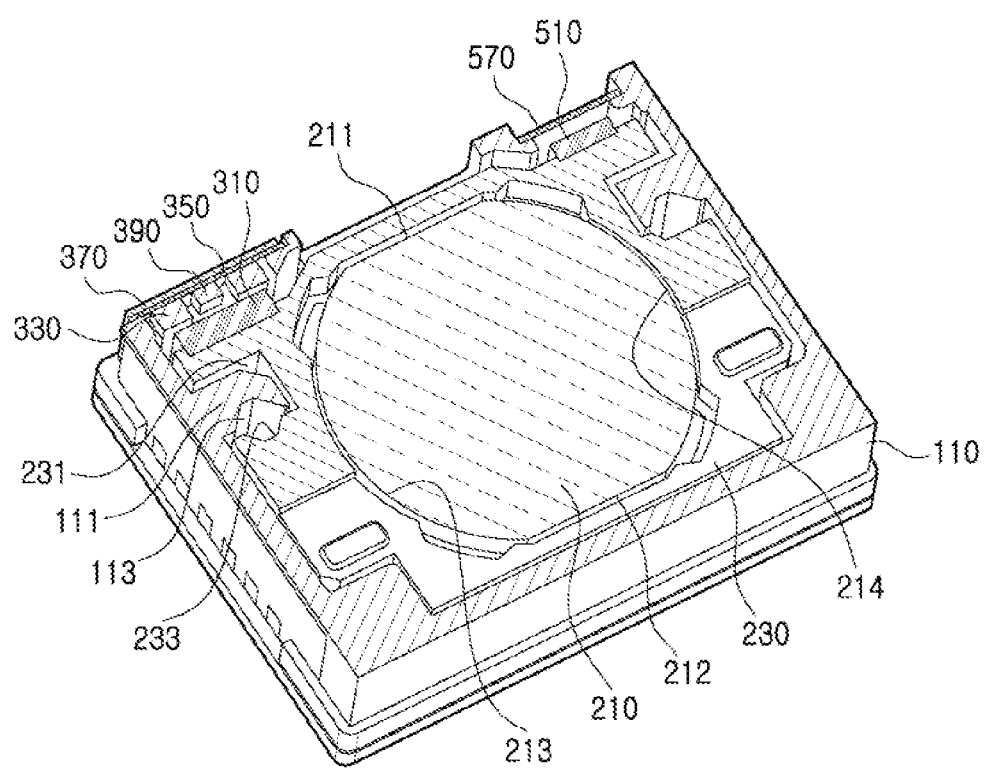
FIG. 6 is a schematic sectional perspective view taken along a line I-I' of FIG. 2.
Figure 9:
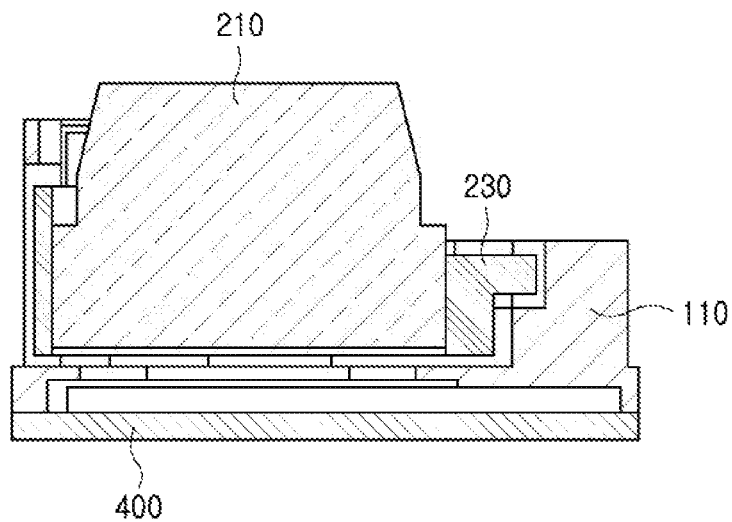
FIG. 9 is a schematic cross-sectional view taken along a line III-III' of FIG. 2.

FIG. 6 is a schematic sectional perspective view taken along a line I-I' of FIG. 2. FIG. 7 is a schematic cross-sectional view taken along a line I-I' of FIG. 2. FIG. 8 is a schematic cross-sectional view taken along a line II-II'. FIG. 9 is a schematic cross-sectional view taken along a line III-III'.

Referring to FIGS. 6 to 9, the actuator 300 may be arranged to be offset to one side of the carrier 230, with respect to one surface (e.g., lateral surface) of the carrier 230. That is, the actuator 300 may be arranged in one side-edge region of the camera module 100.

As shown in FIG. 7, the magnet 310 may be installed in the first step difference portion 235 of one surface of the lens module 200 and, thus, a shortest distance D1 between the reference line IL and the magnet 310 may be less than a shortest distance D3 between the reference line IL and the convex portion 237 of the lens module 200. Thus, the shortest distance D1 between the optical axis O and a straight line that extends from one surface of the magnet 310 may be less than the shortest distance D3 between the optical axis O and the convex portion 237 of the lens module 200.

A shortest distance D2 between the reference line IL and the magnetic member 510 may be less than the shortest distance D3 between the reference line IL and the convex portion 237 of the lens module 200. Thus, the shortest distance D2 between the optical axis O and a straight line that extends from one surface of the magnetic member 510 may be less than the shortest distance D3 between the optical axis O and the convex portion 237 of the lens module 200.

The coil 330 may be arranged in the opening 114 of the housing 110 to face the magnet 310. A shortest distance D4 between the reference line IL and the coil 330 may be less than the shortest distance D3 between the reference line IL and the convex portion 237 of the lens module 200. Thus, the shortest distance D4 between the optical axis O and the straight line that extends from one surface of the coil 330 may be less than the shortest distance D3 between the optical axis O and the convex portion 237 of the lens module 200.

Accordingly, the camera module 100 may reduce a space occupied by the actuator 300 and, thus, a distance between the optical axis O of the lens barrel 210 and one external side surface of the housing 110 may be relatively short, thereby enabling thinning of the bezel 40 of the front surface of the portable electronic device 30.

The lens barrel 210 may have a non-circular shape in a sectional view taken in a perpendicular direction to the optical axis O. Although not shown, at least one of lenses accommodated in the lens barrel 210 may have a shape corresponding to the lens barrel 210.

For example, referring to FIGS. 6 and 7, the lens barrel 210 may include a plane portion and a circular arc portion at a lateral surface of the lens barrel 210. The plane portion may include a first plane portion 211 and a second plane portion 212 that are formed in parallel to a plane containing the optical axis O. The circular arc portion may include a first circular arc portion 213 and a second circular arc portion 214 that connect the first plane portion 211 and the second plane portion 212 and have predetermined curvatures.

The first plane portion 211 and the second plane portion 212 may be arranged substantially parallel to a shorter side (side with a shorter length) of the image sensor 410.

The shortest distance D2 between the reference line IL and the magnet 310 may be less than a shortest distance D5 between the reference line IL and a center portion of a lateral surface (e.g., the first plane portion 211) of the lens barrel 210. Thus, the shortest distance D2 between the optical axis O and a straight line extending from one surface of the magnet 310 may be less than the shortest distance D5 between the optical axis O and a center portion of a lateral surface (e.g., the first plane portion 211) of the lens barrel 210.

The shortest distance D4 between the reference line IL and the coil 330 may be less than the shortest distance D5 between the reference line IL and a center portion of a lateral surface (e.g., the first plane portion 211) of the lens barrel 210. Thus, the shortest distance D4 between the optical axis O and a straight line extending from one surface of the coil 330 may be less than the shortest distance D5 between the optical axis O and a center portion of a lateral surface (e.g., the first plane portion 211) of the lens barrel 210.

Figure 10:
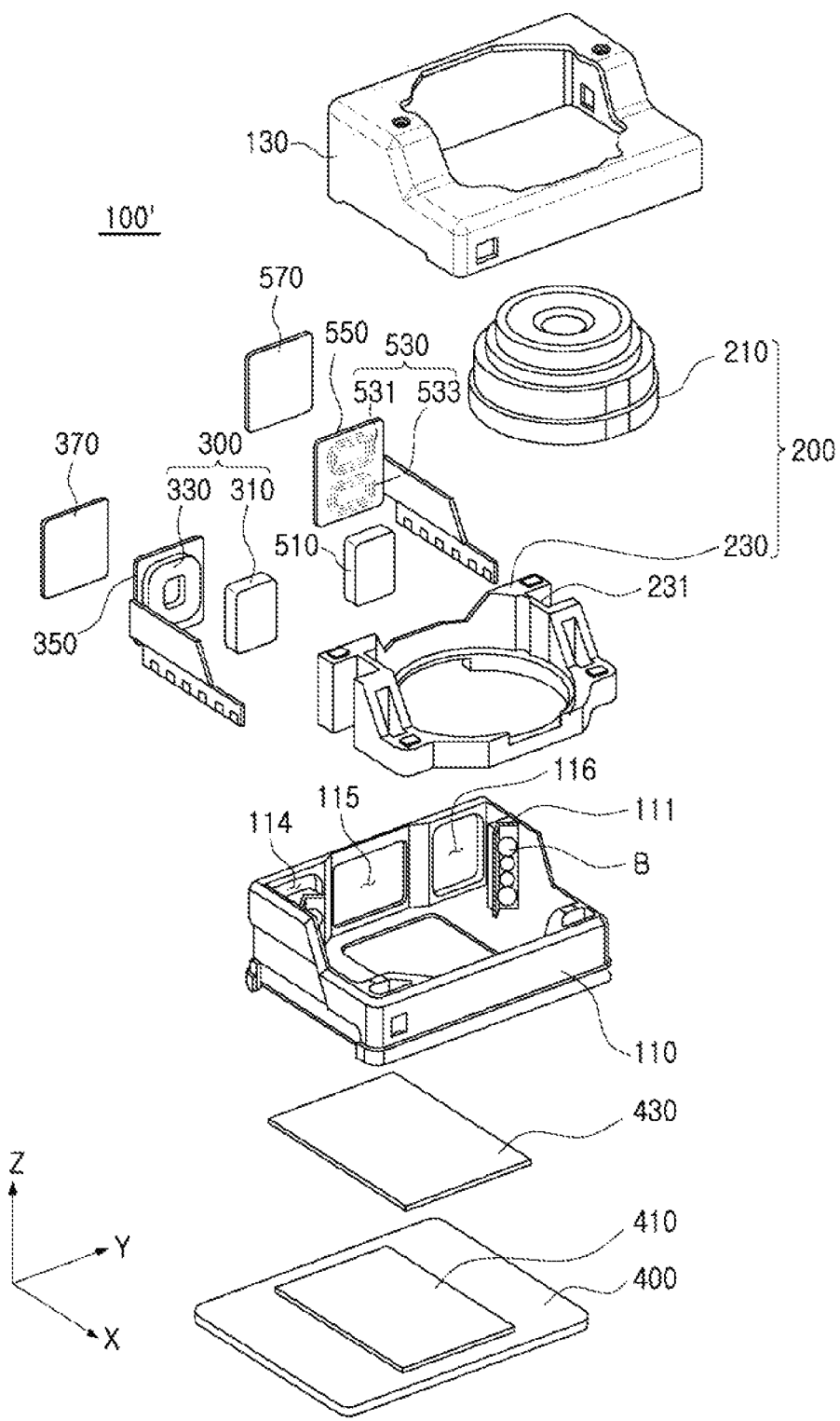
FIG. 10 is an exploded perspective view of a camera module, according to another embodiment.
Figure 11:
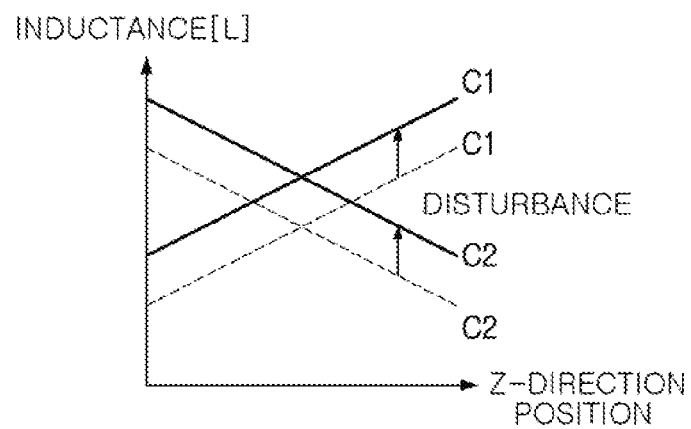
FIG. 11 is a diagram illustrating a change of inductance in a sensing coil portion of a camera module, according to an embodiment.
Figure 12:
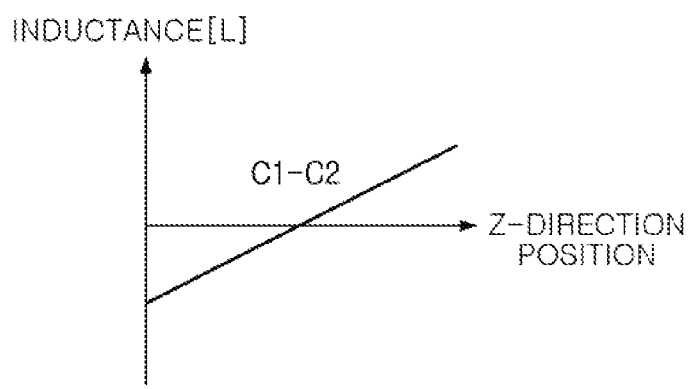
FIG. 12 is a diagram illustrating a method of detecting a position of a lens barrel in a camera module, according an embodiment.

FIG. 10 is an exploded perspective view of a camera module 100', according to another embodiment. FIG. 11 is a diagram illustrating a change of inductance in a sensing coil portion of the camera module 100', according to an embodiment. FIG. 12 is a diagram illustrating a method of detecting a position of a lens barrel in the camera module 100'.

Referring to FIG. 10, the camera module 100' may include a controller and a sensing coil portion 530 for detecting a position of the lens barrel 210.

The sensing coil portion 530 may be arranged to face the magnetic member 510 included in the carrier 230. The sensing coil portion 530 may be disposed on one surface of a substrate 550 to face the magnetic member 510. The second yoke 570 may be disposed on the other surface of the substrate 550 opposite the one surface on which the sensing coil portion 530 is disposed. The substrate 550 may be fixed to the housing 110 and may be arranged to be offset from a center portion of a lateral surface of the housing 110.

The sensing coil portion 530 may be a copper foil pattern that is stacked and embedded in the substrate 550. The sensing coil portion 530 may be configured with variable inductance as a distance from the magnetic member 510 is changed (see FIG. 11).

The controller may receive an inductance value from the sensing coil portion 530 and detect a position of the lens barrel 210 in an optical axis direction (Z-axis direction). The controller may be integrally configured with a driver integrated circuit (IC) for providing a driving signal to the coil 330.

The sensing coil portion 530 may be arranged to face the magnetic member 510. The magnetic member 510 may be an electric conductor and/or a magnetic substance.

As the carrier 230 is moved in an optical axis direction (Z-axis direction), the magnetic member 510, installed in the carrier 230, may also be moved in the optical axis direction (Z-axis direction). Accordingly, inductance of the sensing coil portion 530 may be changed.

The controller may receive an inductance value from the sensing coil portion 530 and detect a position of the lens barrel 210 in an optical axis direction (Z-axis direction).

Accordingly, the position of the magnetic member 510 may be detected from a change of inductance in the sensing coil portion 530. The magnetic member 510 may be installed in the carrier 230 and the carrier 230 may be moved in the optical axis direction (Z-axis direction) along with the lens barrel 210 and, thus, the position of the lens barrel 210 in the optical axis direction (Z-axis direction) may be detected from a change of inductance in the sensing coil portion 530.

The sensing coil portion 530 may include multiple coils arranged in the optical axis direction (Z-axis direction). For example, the sensing coil portion 530 may include two coils arranged in a column in the optical axis direction (Z-axis direction). In this example, any one of the two coils is referred to as a first sensing coil 531 and the other one of the two coils is referred to as a second sensing coil 533.

As shown in FIG. 11, inductances C1 and C2 of the first sensing coil 531 and the second sensing coil 533, respectively, may also be changed due to causes other than a distance with the magnetic member 510.

For example, the inductances C1 and C2 of the first sensing coil 531 and the second sensing coil 533 may be also be changed due to influence of disturbance such as a temperature change of a surrounding environment. Accordingly, an error may occur in the detected position of the lens barrel 210 due to such disturbance.

As shown in FIG. 12, a direction along the optical axis O in which movement of the lens barrel 210 increases the inductance C1 of the first sensing coil 531 may be different from a direction along the optical axis O in which movement of the lens barrel 210 increases the inductance C2 of the second sensing coil 533. Likewise, a direction along the optical axis O in which movement of the lens barrel 210 decreases the inductance C1 of the first sensing coil 531 may be different from a direction along the optical axis O in which movement of the lens barrel 210 decreases the inductance C2 of the second sensing coil 533.

According to the embodiment of FIG. 10, influence of disturbance may be removed and an accurate position of the lens barrel 210 may be detected in consideration of both a change in the inductance C1 of the first sensing coil 531 and a change in the inductance C2 of the second sensing coil 533.

For example, when the position of the lens barrel 210 in the optical axis direction (Z-axis direction) is detected, the inductance C2 of the second sensing coil 533 may be subtracted from the inductance C1 of the first sensing coil 531 (C1-C2) to accurately detect the position of the lens barrel 210 in the optical axis direction (Z-axis direction).

A value obtained by subtracting the inductance C2 of the second sensing coil 533 from the inductance C1 of the first sensing coil 531 (C1-C2) may be increased or reduced according to a position of the lens barrel 210 irrespective of disturbance.

That is, when the magnetic member 510 is moved in the optical axis direction (Z-axis direction), the position of the lens barrel 210 in the optical axis direction (Z-axis direction) may be accurately detected using a signal difference between the first sensing coil 531 and the second sensing coil 533.

Figure 13:
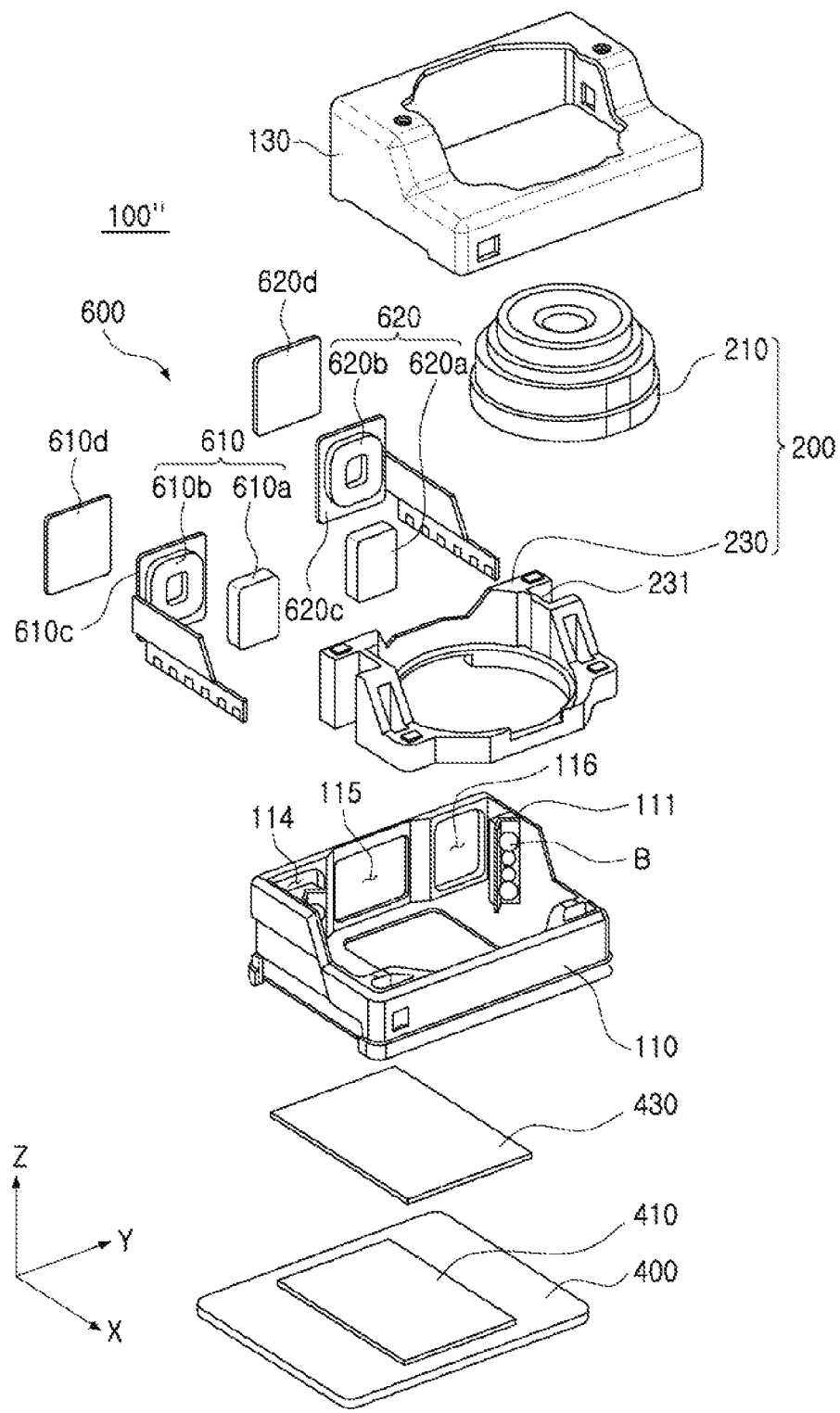
FIG. 13 is an exploded perspective view of a camera module, according to another embodiment.

FIG. 13 is an exploded perspective view of a camera module 100", according to another embodiment.

Referring to FIG. 13, the camera module 100" may include an actuator 600 including a first actuator 610 and a second actuator 620.

The actuator 600 may be arranged at opposite sides of the lens module 200, with respect to one surface of the lens module 200. For example, the actuator 600 may include the first actuator 610 arranged to be offset to one side from a center portion of a lateral surface of the lens module 200, and the second actuator 620 arranged to be offset to the other side from the center portion of the lateral surface of the lens module 200. The first actuator 610 and the second actuator 620 may each generate driving force to move the lens module 200 in the optical axis direction (Z-axis direction).

The first actuator 610 may include a first magnet 610a installed in the lens module 200 and a first coil 610b arranged to face the first magnet 610a. For example, the first magnet 610a may be installed on one surface (e.g., lateral surface) of the carrier 230 and may be arranged to be offset to one side of the carrier 230, with respect to one surface of the carrier 230. The first coil 610b may be disposed on one surface of a first substrate 610c to face the first magnet 610a. The first substrate 610c may be fixed to the housing 110 and may be arranged to be offset to one side of the housing 110, with respect to one surface (e.g., lateral surface) of the housing 110.

The second actuator 620 may include a second magnet 620a installed in the lens module 200 and a second coil 620b arranged to face the second magnet 620a. For example, the second magnet 620a may be installed on the one surface (e.g., lateral surface) of the carrier 230 and may be arranged to be offset to the other side of the carrier 230 (opposite the one side of the carrier 230 to which the first magnet 610a is offset), with respect to the one surface of the carrier 230. The second coil 620b may be disposed on one surface of a second substrate 620c to face the second magnet 620a. The second substrate 620c may be fixed to the housing 110 and may be arranged to be offset to the other side of the housing 110 (opposite the one side of the housing to which the first substrate 610c is offset), with respect to the one surface (e.g., lateral surface) of the housing 110.

The convex portion 237, and the first step difference portion 235 and the second step difference portion 239 that are stepped-in on opposite sides of the convex portion 237 may be disposed on one surface of the lens module 200.

The first magnet 610a may be arranged in the first step difference portion 235 and the second magnet 620a may be arranged in the second step difference portion 239.

A distance of the first magnet 610a, the second magnet 620a, the first coil 610b, and the second coil 620b with respect to the optical axis O is the same as in the aforementioned camera module 100 illustrated in FIGS. 1 to 9 and, thus, a detailed description thereof is omitted herein.

The housing 110 may have an open portion at which the first substrate 610c and the second substrate 620c are installed. For example, openings 114 and 116 may be formed in the lateral surface of the housing 110 and the first coil 610b and the second coil 620b may be arranged in the openings 114 and 116.

The first magnet 610a and the second magnet 620a may be movable members that are installed in the carrier 230 and move in the optical axis direction (z-axis direction) along with the carrier 230. The first coil 610b and the second coil 620b may be fixed members that are fixed to the housing 110.

When power is applied to the first coil 610b and the second coil 620b, the carrier 230 may be moved in the optical-axis direction (Z-axis direction) by electromagnetic influence between the first magnet 610a and the first coil 610b, and electromagnetic influence between the second magnet 620a and the second coil 620b. The lens barrel 210 may be coupled to the carrier 230 and, thus, the lens barrel 210 may also be moved in the optical axis direction (z-axis direction) via movement of the carrier 230.

A first yoke 610d may be installed on the first substrate 610c. For example, the first yoke 610d may be disposed on the other surface of the first substrate 610c (opposite the one surface of the first substrate 610c on which the first coil 610b is disposed). A second yoke 620d may be installed on the second substrate 620c. For example, the second yoke 620d may be disposed on the other surface of the second substrate 620c (opposite the one surface of the second substrate 620c on which the second coil 620b is disposed.

The first yoke 610d may be arranged to face the first magnet 610a and the second yoke 620d may be arranged to face the second magnet 620a. Accordingly, attractive force may be applied between the first yoke 610d and the first magnet 610a and between the second yoke 620d and the second magnet 620a in a perpendicular direction (e.g., X-axis direction) to an optical axis. Accordingly, the rolling member(s) B may be maintained in a contact state with the carrier 230 and the housing 110 by attractive force between the first yoke 610d and the first magnet 610a, and between the second yoke 620d and the second magnet 620a.

According to the embodiment of FIG. 13, to detect a position of the lens barrel 210, the position sensor 390 may be included as in the camera module 100 of FIGS. 1 to 9, or the sensing coil portion 530 may be included as in the camera module 100' of FIG. 10.

When the position sensor 390 is included, the position sensor 390 may be arranged inside the first coil 610b and/or the second coil 620b. When the sensing coil portion 530 is included, the sensing coil portion 530 may be arranged to face the first magnet 610a and/or the second magnet 620a and to be arranged adjacent to the first coil 610b and/or the second coil 620b.

According to embodiments disclosed herein, a camera module may be miniaturized and a bezel region of a portable electronic device may be thinned.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A camera module, comprising:
a housing configured to accommodate a lens module; and
an actuator configured to move the lens module in an optical axis direction, and comprising a magnet disposed in the lens module and a coil facing the magnet, wherein a convex portion and a first step difference portion stepped from the convex portion are disposed on one surface of the lens module, wherein the first step difference portion is offset to one side from a center of the one surface, and wherein the magnet is disposed in the first step difference portion and is offset to the one side from the center of the one surface.

2. The camera module of claim 1, wherein a shortest distance between a reference line and the magnet is less than a shortest distance between the reference line and the convex portion, and wherein the reference line is an imaginary straight line extending through an optical axis of the camera module in a length direction of the lens module.

3. The camera module of claim 2, wherein a shortest distance between the reference line and the coil is less than the shortest distance between the reference line and the convex portion.

4. The camera module of claim 1, wherein a second step difference portion stepped from the convex portion is offset to another side from a center of the one surface, and a magnetic member is installed in the second step difference portion.

5. The camera module of claim 4, wherein a shortest distance between a reference line and the magnetic member is less than a shortest distance between the reference line and the convex portion, and wherein the reference line is an imaginary straight line extending through an optical axis of the camera module in a length direction of the lens module.

6. The camera module of claim 4, further comprising:
a first yoke facing the magnet and fixed to the housing; and
a second yoke facing the magnetic member and fixed to the housing.

7. The camera module of claim 4, further comprising:
a sensing coil portion disposed to face the magnetic member and having an inductance that varies as the magnetic member is moved in the optical axis direction.

8. The camera module of claim 7, wherein the sensing coil portion comprises a first sensing coil and a second sensing coil that are arranged in a column in the optical axis direction.

9. The camera module of claim 8, wherein a direction along an optical axis of the camera module in which movement of the lens barrel increases an inductance of the first sensing coil is different from a direction along the optical axis in which movement of the lens barrel increases an inductance of the second sensing coil, and wherein a direction along the optical axis in which movement of the lens barrel decreases the inductance of the first sensing coil is different from a direction along the optical axis in which movement of the lens barrel decreases the inductance of the second sensing coil.

10. The camera module of claim 1, wherein the lens module comprises a lens barrel including lenses, and a carrier coupled to the lens barrel and configured to move in the optical axis direction along with the lens barrel, wherein the lens barrel comprises a plane portion at a lateral surface of the lens barrel, wherein a shortest distance between a reference line and the magnet is less than a shortest distance between the reference line and the plane portion, and wherein the reference line is an imaginary straight line extending through an optical axis of the camera module in a length direction of the lens module.

11. The camera module of claim 10, wherein a shortest distance between the reference line and the coil is less than a shortest distance between the reference line and the plane portion.

12. The camera module of claim 1, wherein a distance between an optical axis of the camera module and one external side surface of the housing is less than a distance between the optical axis and another external side surface of the housing opposite the one external side surface of the housing.

13. A camera module, comprising:
a housing configured to accommodate a lens module;
a first actuator comprising a first magnet disposed on one surface of the lens module and offset to one side from a center of the one surface of the lens module, and a first coil facing the first magnet; and
a second actuator comprising a second magnet disposed on one surface of the lens module and offset to another side from the center of the one surface of the lens module, and a second coil facing the second magnet,
wherein a convex portion, and first and second step difference portions stepped on opposite sides of the convex portion are disposed on the one surface of the lens module; and
wherein the first magnet is disposed in the first step difference portion and the second magnet is disposed in the second step difference portion.

14. The camera module of claim 13, wherein a shortest distance between an optical axis of the camera module and a straight line extending on one surface of the first magnet, and a shortest distance between the optical axis and a straight line extending on one surface of the second magnet, are less than a shortest distance between the optical axis and the convex portion.

15. The camera module of claim 13, wherein a shortest distance between an optical axis of the camera module and a straight line extending on one surface of the first coil, and a shortest distance between the optical axis and a straight line extending on one surface of the second coil, are less than a shortest distance between the optical axis and the convex portion.

16. The camera module of claim 13, wherein the lens module comprises a lens barrel including lenses, and a carrier coupled to the lens barrel and configured to move in the optical axis direction along with the lens barrel,
wherein the lens barrel comprises a plane portion at a lateral surface of the lens barrel, and
wherein a shortest distance between an optical axis of the camera module and a straight line extending on one surface of the first magnet, and a shortest distance between the optical axis and a straight line extending on one surface of the second magnet, are less than a shortest distance between the optical axis and the plane portion.

* * * * *